(12) United States Patent
Jing et al.

(10) Patent No.: US 10,944,936 B2
(45) Date of Patent: *Mar. 9, 2021

(54) BEAM FORMING FOR MICROPHONES ON SEPARATE FACES OF A CAMERA

(71) Applicant: GoPro, Inc., San Mateo, CA (US)

(72) Inventors: Zhinian Jing, Pacifica, CA (US); Joyce Rosenbaum, Mountain View, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/550,566

(22) Filed: Aug. 26, 2019

(65) Prior Publication Data
US 2020/0021771 A1    Jan. 16, 2020

Related U.S. Application Data

(63) Continuation of application No. 16/154,079, filed on Oct. 8, 2018, now Pat. No. 10,425,610, which is a
(Continued)

(51) Int. Cl.
*H04N 5/60* (2006.01)
*H04S 7/00* (2006.01)
(Continued)

(52) U.S. Cl.
CPC ............ *H04N 5/607* (2013.01); *H04N 5/225* (2013.01); *H04R 5/027* (2013.01); *H04S 7/305* (2013.01);
(Continued)

(58) Field of Classification Search
CPC .... H04N 5/607; H04N 5/225; H04N 5/23264; H04N 5/232; H04S 7/305; H04S 2400/15;
(Continued)

(56) References Cited

U.S. PATENT DOCUMENTS 9,674,587 B2     6/2017 Triplett
2010/0019715 A1*  1/2010 Roe .................. B25J 19/023
                                                       318/568.12
(Continued)

*Primary Examiner* — Yogesh K Aggarwal
(74) *Attorney, Agent, or Firm* — Young Basile Hanlon & MacFarlane, P.C.

(57) ABSTRACT

A camera system capable of capturing images of an event in a dynamic environment includes two microphones configured to capture stereo audio of the event. The microphones are on orthogonal surfaces of the camera system. Because the microphones are on orthogonal surfaces of the camera system, the camera body can impact the spatial response of the two recorded audio channels differently, leading to degraded stereo recreation if standard beam forming techniques are used. The camera system includes tuned beam forming techniques to generate multi-channel audio that more accurately recreates the stereo audio by compensating for the shape of the camera system and the orientation of microphones on the camera system. The tuned beam forming techniques include optimizing a set of beam forming parameters, as a function of frequency, based on the true spatial response of the recorded audio signals.

18 Claims, 10 Drawing Sheets

Related U.S. Application Data continuation of application No. 15/701,426, filed on Sep. 11, 2017, now Pat. No. 10,122,956.

(60) Provisional application No. 62/395,953, filed on Sep. 16, 2016.

(51) Int. Cl.
*H04R 5/027* (2006.01)
*H04N 5/225* (2006.01)
*H04N 5/232* (2006.01)

(52) U.S. Cl.
CPC ......... *H04N 5/232* (2013.01); *H04N 5/23264* (2013.01); *H04R 2203/12* (2013.01); *H04R 2499/11* (2013.01); *H04S 2400/15* (2013.01)

(58) Field of Classification Search
CPC . H04R 5/027; H04R 2499/11; H04R 2203/12
See application file for complete search history.

(56) References Cited

U.S. PATENT DOCUMENTS

| | | |
|---|---|---|
| 2012/0163606 A1 | 6/2012 | Eronen |
| 2013/0259238 A1 | 10/2013 | Xiang |
| 2016/0198282 A1 | 7/2016 | Kim |
| 2016/0295342 A1* | 10/2016 | Miyasaka ................ H04R 3/12 |

* cited by examiner

FIG. 4A
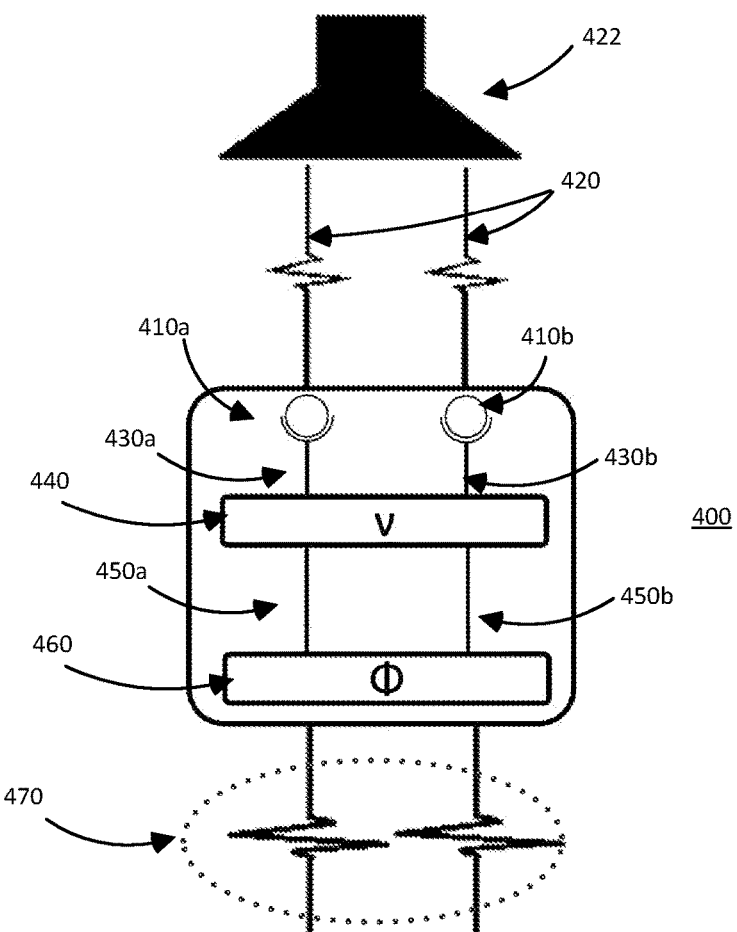
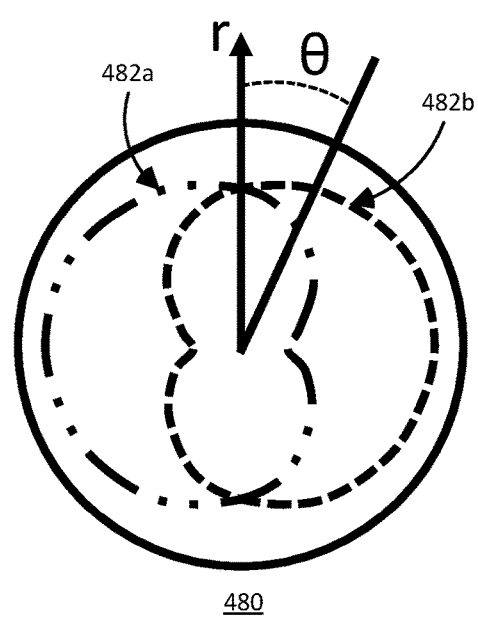
FIG. 4B
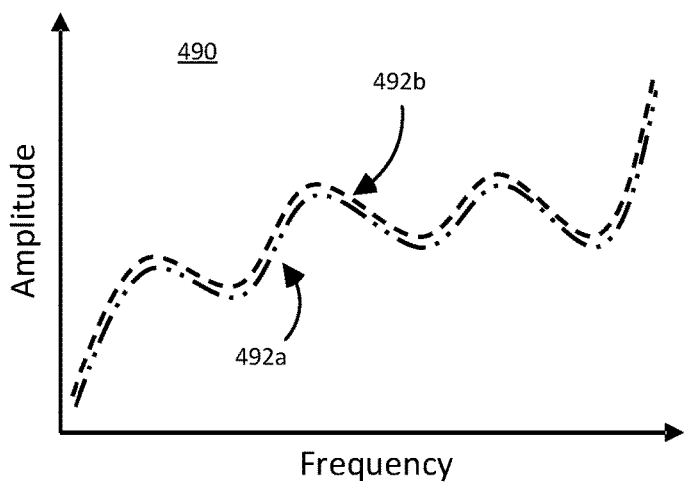
FIG. 4C

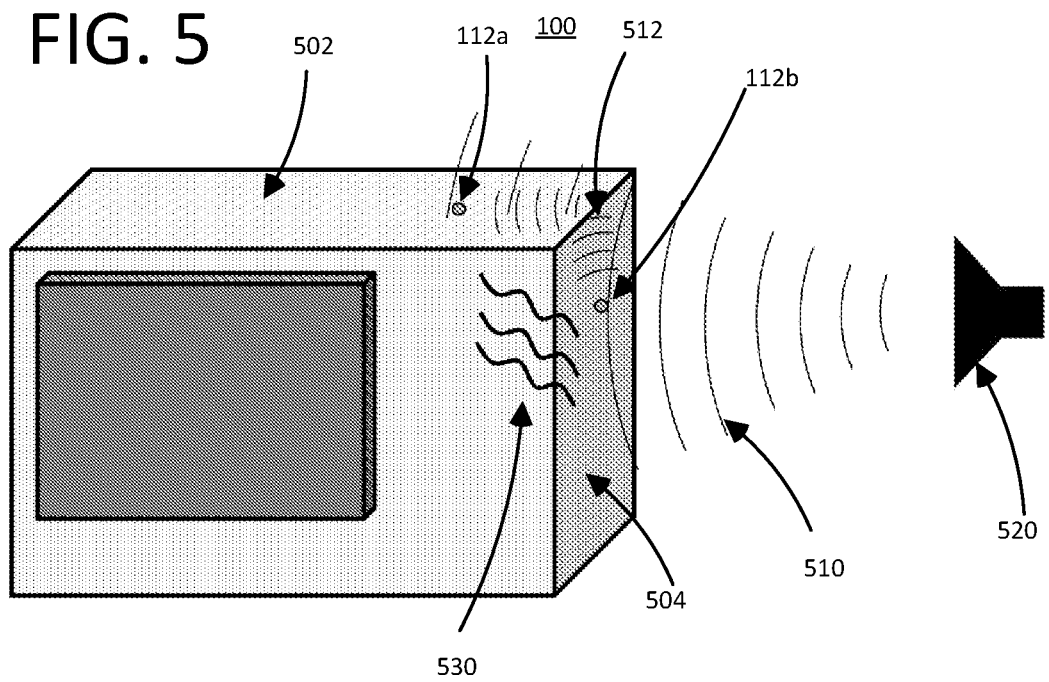

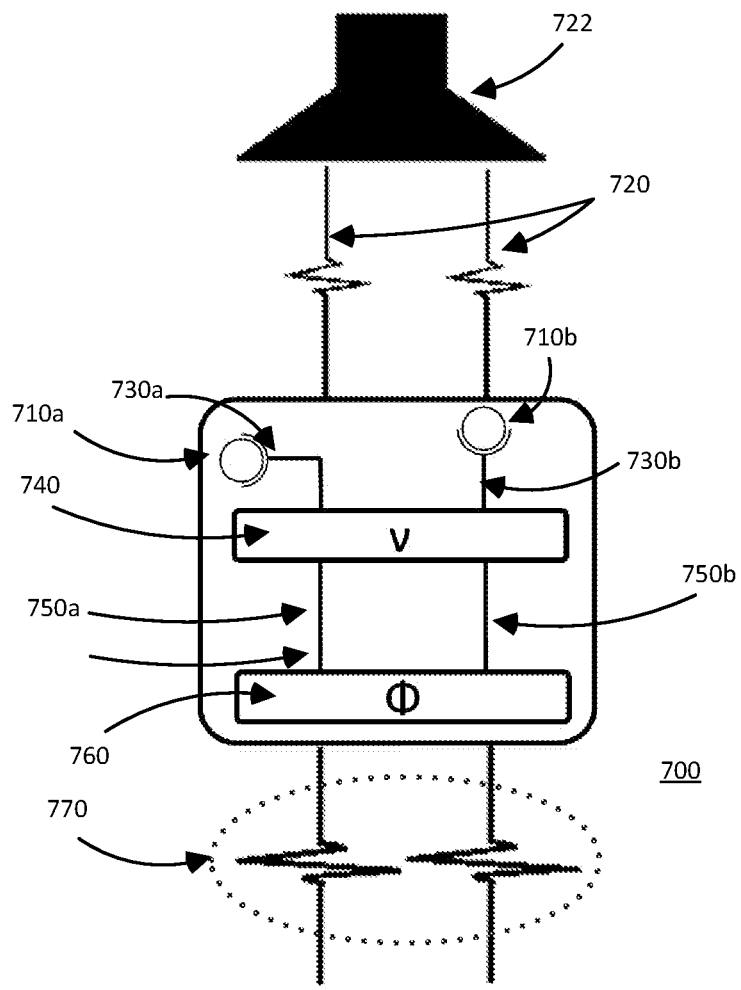
FIG. 7A
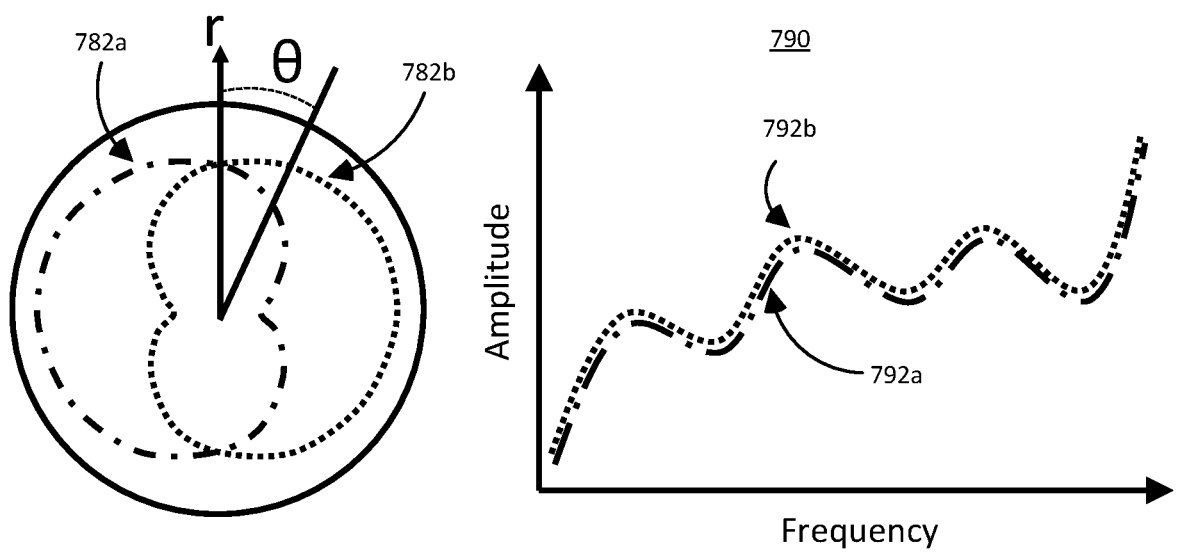
FIG. 7B
FIG. 7C

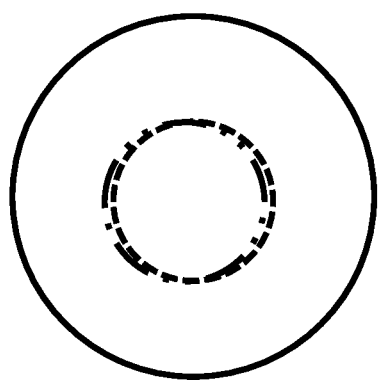
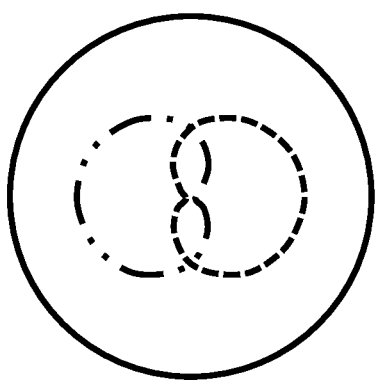
FIG. 9A          FIG. 9B
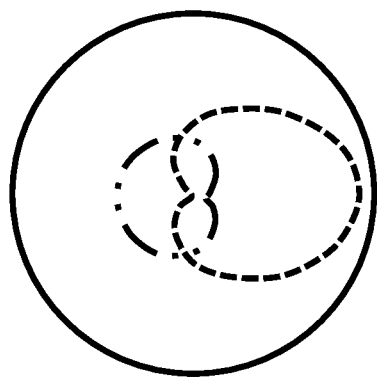
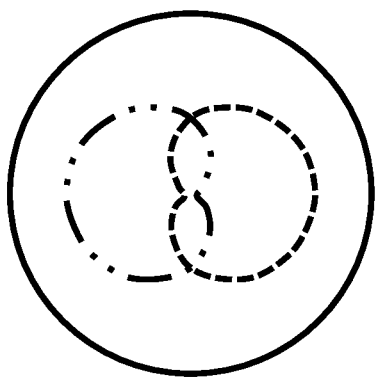
FIG. 9C          FIG. 9D

BEAM FORMING FOR MICROPHONES ON SEPARATE FACES OF A CAMERA

CROSS REFERENCE TO RELATED APPLICATIONS

This application is a continuation of U.S. patent application Ser. No. 16/154,079, filed on Oct. 8, 2018, which is a continuation of U.S. patent application Ser. No. 15/701,426, filed on Sep. 11, 2017, now U.S. Pat. No. 10,122,956, which claims the benefit of U.S. Provisional Application No. 62/395,953, filed Sep. 16, 2016, both of which are incorporated by reference in their entirety.

TECHNICAL FIELD

This description generally relates to a camera system, and specifically to the audio systems of a camera system with multiple microphones.

BACKGROUND

When recording audio events in a dynamic environment for playback at a later time, it is important to process the audio signals such that when the signals are reproduced by the playback device, they closely resemble the audio event as experienced by the listener. For some time, beam forming techniques have been applied to signals recorded with microphone arrays in these situations to more accurately reproduce the spatial characteristics of audio signals during playback.

However, as recording electronics, and specifically cameras, have advanced, microphone arrays have shrunk to being confined within a singular small device. Design limitations to these cameras force the microphone arrays to have microphones in non-optimal locations for audio recording. These non-optimal locations create a variety of problems for traditional beam forming techniques.

BRIEF DESCRIPTION OF DRAWINGS

FIG. 4A illustrates of stereo audio generation from a camera system with two microphone systems on the same planar surface, according to one embodiment.

FIG. 4B illustrates the polar spatial response from a camera system with two microphone systems on the same planar surface, according to one embodiment.

FIG. 4C illustrates the frequency response of a camera system with two microphone systems on the same planar surface, according to one embodiment.

FIG. 5 demonstrates a camera with two microphones on orthogonal surfaces showing sound waves and camera system vibrations, according to one embodiment.

FIG. 7A illustrates stereo audio generation from a camera system with two microphone systems on orthogonal surfaces using corrections, according to one embodiment.

FIG. 7B illustrates the polar spatial response from a camera system with two microphone systems on orthogonal surfaces, according to one embodiment.

FIG. 7C illustrates the frequency response of a camera system with two microphone systems on orthogonal surfaces using corrections, according to one embodiment.

FIGS. 9A-9D show examples of corrected audio for different frequency regimes, according to one example embodiment.

DETAILED DESCRIPTION

Figure 1A:
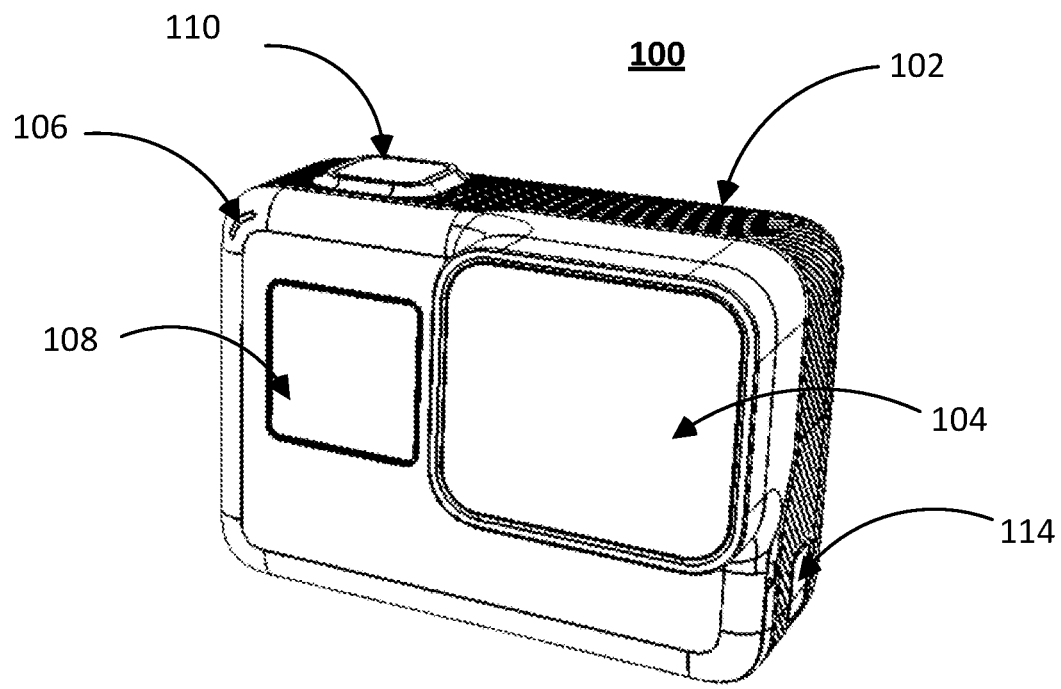
FIG. 1A is an isometric view of a camera system including a microphone array, according to one embodiment.
Figure 1B:
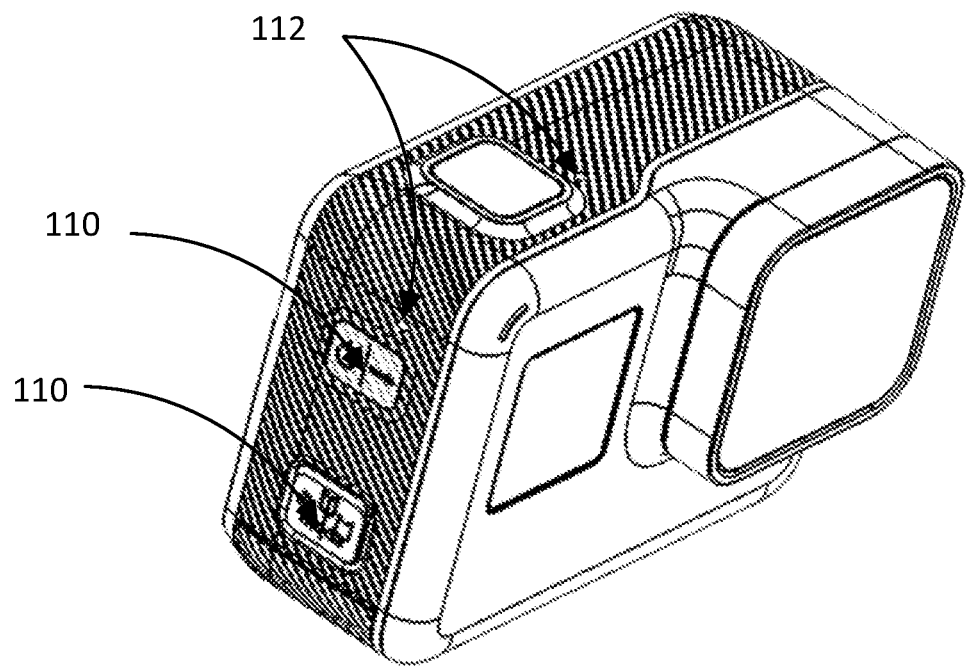
FIG. 1B is an isometric view of a camera system including a microphone array, according to one embodiment.
Figure 1C:
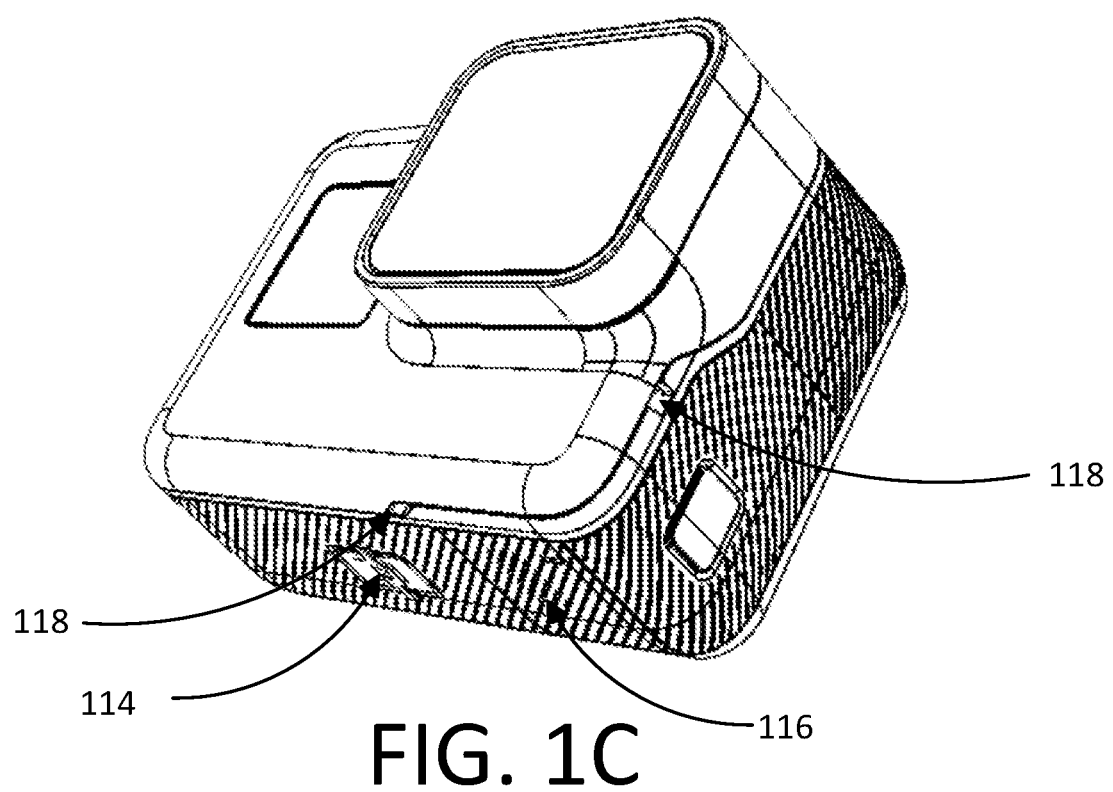
FIG. 1C is an isometric view of a camera system including a microphone array, according to one embodiment.
Figure 1D:
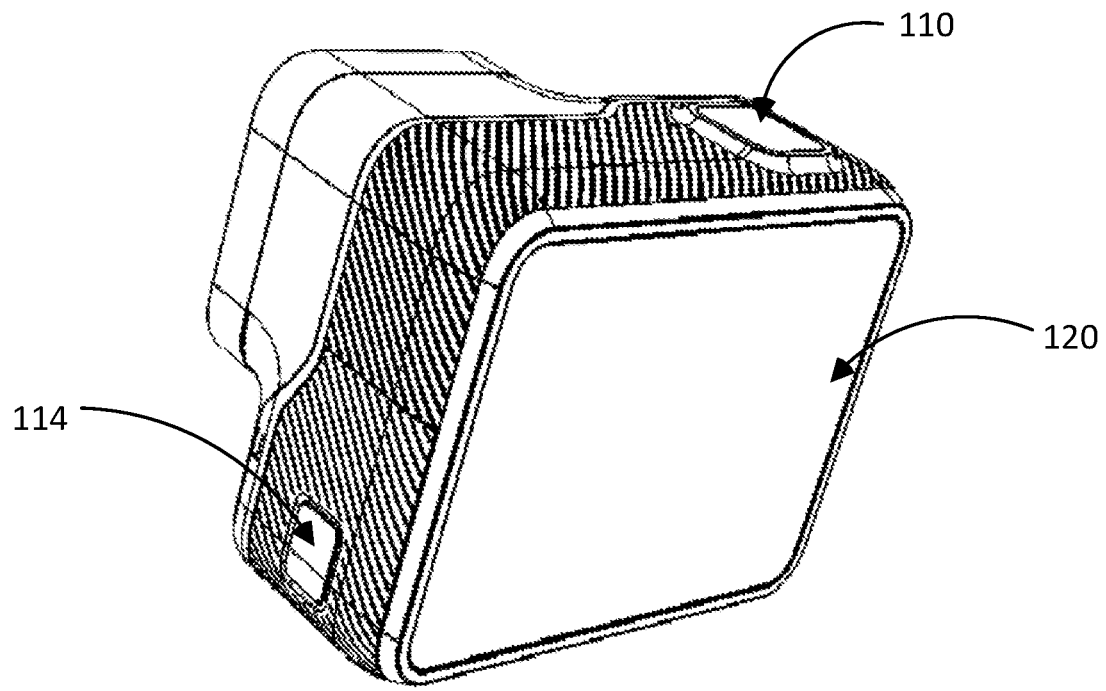
FIG. 1D is an isometric view of a camera system including a microphone array, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A camera system to record video and audio signals from a dynamic external environment that processes the audio signals such that the audio signals are an accurate reproduction of the dynamic environment when reproduced on a stereo speaker system is described. The camera system includes an image sensor to detect and capture images from sources external to the camera body. The camera system also includes a first microphone on a first surface of the camera body and a second microphone on a second surface of the camera body. In some configurations, the first surface is substantially orthogonal to the second surface.

The camera system includes an audio assembly coupling the first microphone to the second microphone. The audio assembly is configured to capture a first audio channel via the first microphone and a second audio channel via the second microphone. The audio assembly captures the audio channels from an audio source during the capture of images by the image sensor. The audio assembly is further configured to output the audio channels.

The camera system also includes a processor coupled to the audio assembly. The processor is configured to receive the captured audio channels from the audio assembly. The processor applies a set of tuned beam forming parameters tuned for temporal, spectral, and spatial characteristics in the audio channels associated with the orthogonality of the first surface and the second surface. The temporal, spectral, and spatial characteristics affect the representation of the audio source during stereo audio playback.

The processor processes the captured audio channels using the set of tuned beam forming parameters. The tuned beam forming parameters applies a delay to the first audio channel and the second audio channel associated with the orthogonality of the first surface and the second surface. Applying the delay generates a first virtual microphone channel and a second virtual microphone channel. The virtual audio channels are an improved representation of the audio source during stereo audio playback.

The processor combines the first virtual audio channel and the second virtual audio channel into an audio stream that is configured for stereo audio playback. The processor outputs the audio stream.

In one configuration, the set of tuned beam forming parameters applied to the audio channels is associated with the linear distance between the first microphone and the second microphone across the surface of the camera body. In another configuration, the set of tuned beam forming parameters applied to the audio channels is associated with the linear distance between the first microphone and the second microphone through the body of the camera.

In one configuration, the set of tuned beam forming parameters applied to the channels is based on maximizing a noise ratio between opposing hemispheres of the spatial response of the first and second audio signals.

In one configuration, the set of tuned beam forming parameters can be independently applied to separate frequency sub-bands of the audio channels based on the shape of the camera body and the frequency range of the sub-band. In another configuration, the tuned set of beam forming parameters access gain and delay values stored in the system memory of the camera system. In another configuration, the tuned set of beam forming parameters is determined by the camera system.

In other configurations, generating a set of virtual audio channels using a set of tuned beam forming parameters can be accomplished by any electronic device capable of recording multiple microphone signals.

Example Camera Configuration

FIGS. 1A-1D illustrate an embodiment of an example camera 100 that may produce beam-formed audio. The camera 100 may comprise a camera body 102 having a camera lens 104 structured on a front surface of the camera body 102, various indicators on the front of the surface of the camera body 102 (such as LEDs, displays, and the like), various input mechanisms (such as buttons, switches, and touch-screen mechanisms), and electronics (e., imaging electronics, power electronics, etc.) internal to the camera body 102 for capturing images via the camera lens 104 and/or performing other functions. The camera 100 may be configured to capture images and video, and to store captured images and video for subsequent display or playback.

The camera 100 can include various indicators, including the LED lights 106 and the LED display 108. The camera 100 can also include buttons 110 configured to allow a user of the camera to interact with the camera, to turn the camera 100 on, and to otherwise configure the operating mode of the camera 100. The camera 100 can also include a microphone 112 configured to receive and record audio signals in conjunction with recording video. While the microphones 112 illustrated in FIG. 1 are on two orthogonal surfaces of the camera 100, the microphones can be on any two surfaces (or the same surface) of the camera 100. The side of the camera 100 may include an I/O interface 114. The camera 100 may also include a loudspeaker 116 system integrated into the camera housing. In some examples, the loudspeaker can include a speaker system capable of stereo audio playback. The front surface of the camera 100 may include two drainage ports as part of a drainage channel 118 for the camera audio system. The camera can include an interactive display 120 that allows for interaction with the camera while simultaneously displaying camera information on a surface of the camera 100. As illustrated, the camera 100 may include a lens 104 configured to receive light incident upon the lens 104 and to direct received light onto an image sensor internal to the lens.

The camera 100 includes a camera exterior that encompasses and protects the camera's internal electronics, which are further described in later sections. The camera 100 exterior includes 6 surfaces (i.e. a front face, a left face, a right face, a back face, a top face, and a bottom face), wherein the exterior surfaces form a rectangular cuboid. Furthermore, both the front and rear surfaces of the camera 100 are substantially rectangular in shape. The camera 100 can be made of a rigid material such as plastic, aluminum, steel, or fiberglass. Additional camera features, such as the features described above, may be affixed to an exterior of the camera 100. In some embodiments, the camera described herein includes features other than those described below. For example, instead of a single interface button, the camera can include additional buttons or different interface features, such as a multiple microphone openings to receive voice or other audio commands.

Example System Configuration

Figure 2:
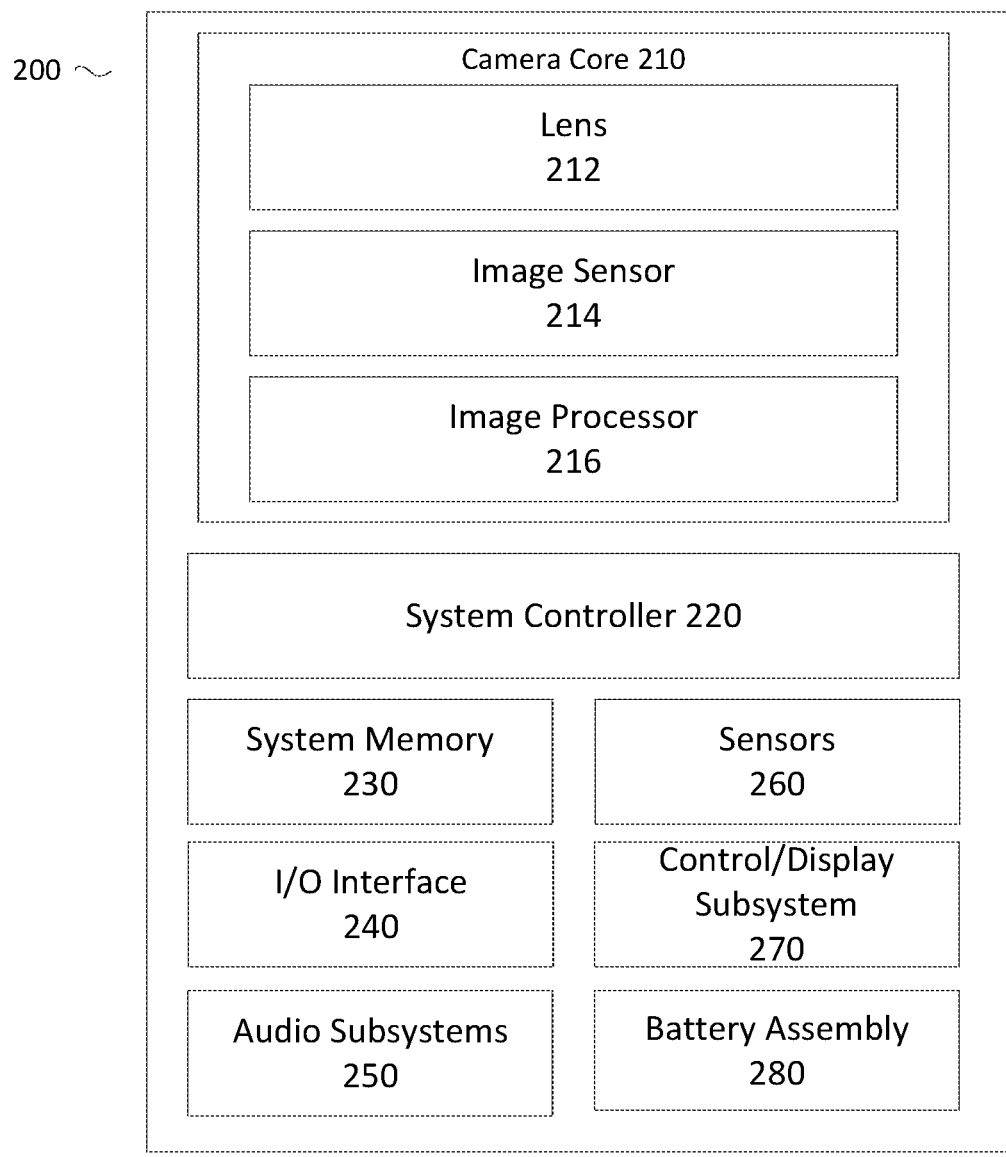
FIG. 2 is a system level description of the camera, according to one embodiment.

FIG. 2 is a block diagram illustrating a system level example camera 200 corresponding to the camera demonstrated in FIGS. 1A-1D that may be submersible. The camera 200 includes a camera core 210, a system controller 220, a system memory 230, an I/O interface 240, an audio subsystem 250, sensors 260, a control/display subsystem 270, a battery assembly 280, and a heat coupler. The camera core includes a lens 212, an image sensor 214, and an image processor 216. The components in FIG. 2 are grouped functionally and do not necessarily reflect a physical architecture of the camera 200. For example, as described above, in one embodiment, the control/display subsystem 270 is embodied in a separate physical integrated circuit chip from the image processor 216. The integrated circuit chip including the image processor 216 may also include, for example, the image sensor 214, the system controller 220, system memory 230 and portions of the audio sub-system 250, I/O interface 240, and control/display sub-system 270.

In the embodiment illustrated in FIG. 2, the camera 200 comprises a camera core 210 comprising a lens 212, an image sensor 214, and an image processor 216. The camera 200 additionally includes a system controller 220 (e.g., a microcontroller or microprocessor) that controls the operation and functionality of the camera 200 and system memory 230 configured to store executable computer instructions that, when executed by the system controller 220 and/or the image processors 216, perform the camera functionalities described hereafter. In some embodiments, a camera 200 may include multiple camera cores 210 to capture fields of view in different directions which may then be stitched together to form a cohesive image. For example, in an embodiment of a spherical camera system, the camera 200 may include two camera cores 210 each having a hemispherical or hyper hemispherical lens that each captures a hemispherical or hyper-hemispherical field of view which is stitched together in post-processing to form a spherical image.

The lens 212 can be, for example, a wide angle lens, hemispherical, or hyper hemispherical lens that focuses light entering the lens to the image sensor 214 which captures images and/or video frames. The image sensor 214 may capture high-definition video having a resolution of, for example, 720p, 1080p, 4 k, or higher. For video, the image sensor 214 may capture video at frame rates of, for example, 30 frames per second, 60 frames per second, or higher. The image processor 216 performs one or more image processing functions of the captured images or video. For example, the image processor 216 may perform a Bayer transformation, de-mosaicing, noise reduction, image sharpening, image stabilization, rolling shutter artifact reduction, color space conversion, compression, or other in-camera processing functions. The image processor 216 may furthermore perform the timing metric calculations discussed above. Processed images and video may be temporarily or persistently stored to system memory 230 and/or to a non-volatile storage, which may be in the form of internal storage or an external memory card. Additionally, the image processor may be configured to capture video or images and not store them in the system memory 230.

An input/output (I/O) interface 240 transmits and receives data from various external devices. For example, the I/O interface 240 may facilitate the receiving or transmitting video or audio information through an I/O port. Examples of I/O ports or interfaces include USB ports, HDMI ports, Ethernet ports, audio ports, and the like. Furthermore, embodiments of the I/O interface 240 may include wireless ports that can accommodate wireless connections. Examples of wireless ports include Bluetooth, Wireless USB, Near Field Communication (NFC), and the like. The I/O interface 240 may also include an interface to synchronize the camera 200 with other cameras or with other external devices, such as a remote control, a second camera, a smartphone, a client device, or a video server.

The audio subsystem 250 includes, for example, one or more microphones and one or more audio processors to capture and process audio data correlated with video capture. In one embodiment, the audio subsystem 250 includes a microphone array having two or more microphones arranged to obtain directional audio signals. In other embodiments, the audio subsystem 250 may be configured to process and modify the collected audio data before outputting audio signals.

Sensors 260 capture various metadata concurrently with, or separately from, video capture. For example, the sensors 260 may capture time-stamped location information based on a global positioning system (GPS) sensor, and/or an altimeter. Other sensors 260 may be used to detect and capture orientation of the camera 200 including, for example, an orientation sensor, an accelerometer, a gyroscope, or a magnetometer. Additional sensors may be used to detect and capture information about the camera system such as internal or external temperature of camera components such as the camera core, the system controller or the battery assembly. The sensors may additionally detect the presence of liquids within or external to the camera body or the proximity of liquids to camera components. The sensors may additionally collect information about the pressure internal or external the camera body.

Sensor data captured from the various sensors 260 may be processed to generate other types of metadata. For example, sensor data from the accelerometer may be used to generate motion metadata, comprising velocity and/or acceleration vectors representative of motion of the camera 200. Sensor data from a GPS sensor can provide GPS coordinates identifying the location of the camera 200, and the altimeter can measure the altitude of the camera 200. In one embodiment, the sensors 260 are rigidly coupled to the camera 200 such that any motion, orientation or change in location experienced by the camera 200 is also experienced by the sensors 260. The sensors 260 furthermore may associates a time stamp representing when the data was captured by each sensor. In one embodiment, the sensors 260 automatically begin collecting sensor metadata when the camera 200 begins recording a video. In still other embodiments the sensors may be external to the camera body and transmit the sensor data or sensor metadata to the camera via the I/O interface 240.

A control/display subsystem 270 includes various control and display components associated with operation of the camera 200 including, for example, LED lights, a display, buttons, microphones, speakers, and the like.

The battery assembly 280 may include power cells for powering various components of the camera system. For example the power cells may be a Lithium—Ion battery, a Nickel—Cadmium battery, a Nickel-metal—Hydride battery, a Lithium—Polymer battery, a Lead-Acid battery, a solar-cell, a power cord to an external power source, a kinetic power generation system, or any other component used to power an electrical system. The battery assembly may be configured to be controlled by the system controller, with the system controller dictating which components of the camera sub-systems and components will receive power during operation. The battery assembly may be controlled by various input mechanisms (such as buttons, switches, and touch-screen mechanisms) on the external body of the camera or by directions received via the I/O interface 240. Additionally, the battery assembly may removable from the camera system to allow for recharging the power cells of the battery assembly or replacing the current battery assembly with a different battery assembly.

Stereo Audio Generation

The composite audio system for use in a camera system may comprise at least two microphone systems internal to the camera body configured to record audio signals from the external environment. Using the multiple microphone systems, the composite audio system may be able to generate at a stereo audio signal from two virtual audio signals using the multiple microphones. The stereo audio signal generated from the two virtual audio signals is defined as the multi-channel audio signal. The multi-channel audio signal may be manipulated such that it is a close approximation of sound experienced by a listener in the environment where the original audio signals were experienced. Generally, the multi-channel audio signal is processed to compensate for the shape of the camera and orientation of the microphones recording the audio signals.

Figure 3:
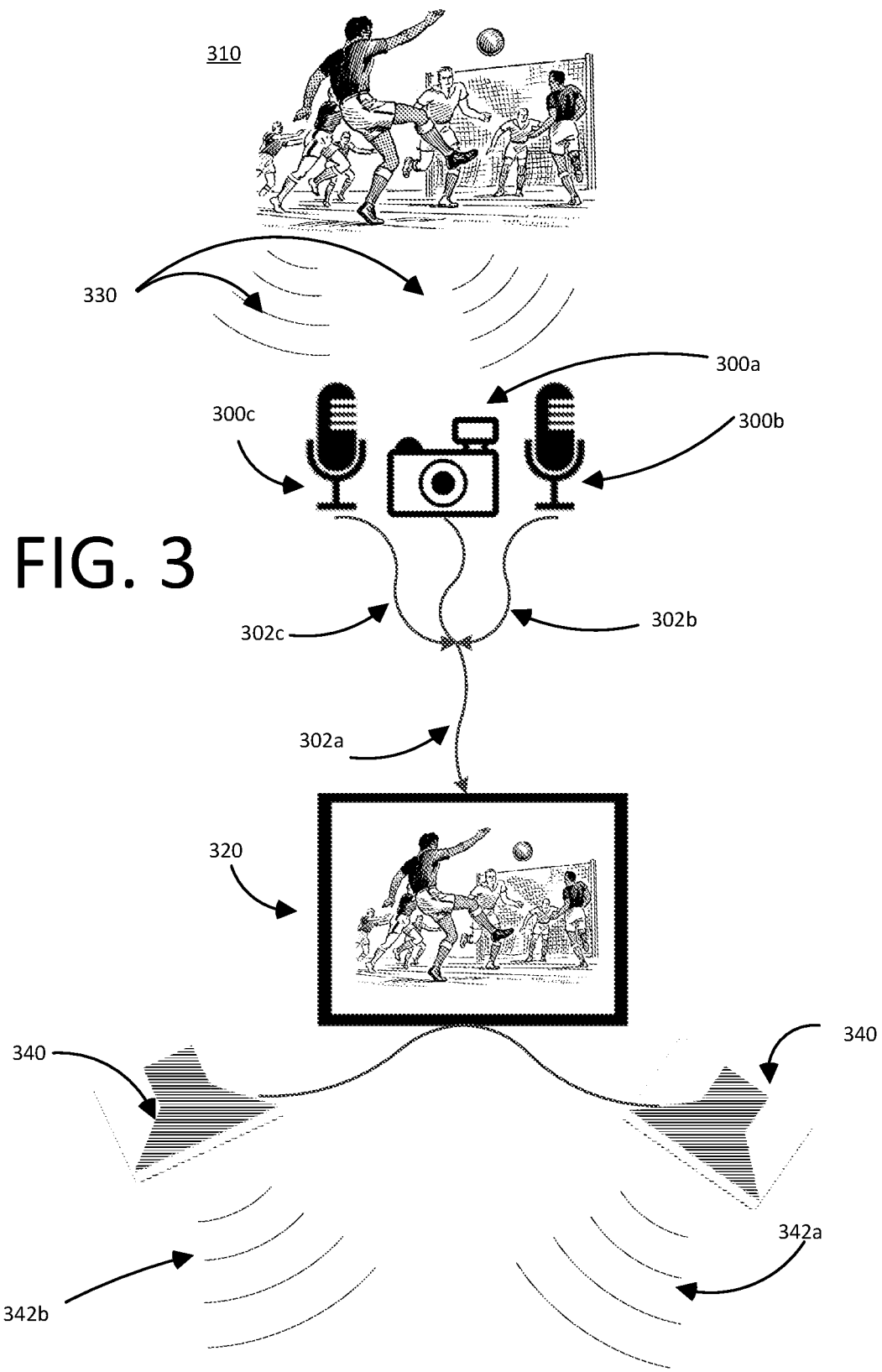
FIG. 3 demonstrates how stereo audio is achieved, according to one embodiment.

FIG. 3 demonstrates an example of how stereophonic audio may be generated. An integrated visual and audio recording system 300 may be present at a dynamic environment 310. The visual recording system 300a can record the actions of the dynamic environment 310 for later playback on a display device 320. The dynamic environment may generate sound waves 330 that can be recorded by the recording system 300 for later playback on a speaker device 340. In the illustrated example, the audio recording system can comprise two microphones 300b and 300c separated in space that record separate audio channels 302b and 302c which are processed and transmitted to the display device 320 and speaker device 340 as a composite, multichannel audio signal 302a.

The display device 320 may display the video recorded of the dynamic environment 310. Multiple speakers 340 may recreate the recorded and processed audio channels 302 such that the recreated sound waves 342a and 342b are a closer approximation to the spatial characteristics of received sound waves 330 than a single speaker playback system.

Stereo Audio Generation in a Camera System

FIG. 4A illustrates an embodiment of a camera system 400 with two microphones recording stereo audio with the microphones on the same surface of the camera that may generate a stereo audio signal. The camera system 400 may be similarly configured to the cameras of FIG. 1 and FIG. 2. Sound waves 420 may be generated by an audio source 422 outside the camera and are propagated towards the front surface of the camera body. In the illustrated system, the audio source 422 is located directly in front of the camera 400 and equally distanced between the two microphones 410 such that when the sound waves 420 interact with the microphones 410 there is minimal delay or amplitude variation between the signals recorded by the microphones 410.

The camera system 400 can have a left microphone 410a and a right microphone 410b on the same surface of the camera system that generates a left audio channel 430a and a right audio channel 430b, respectively. The left and right microphones 410 may be omnidirectional microphones that independently record the sound waves 420 which can be transformed 440 into a left virtual microphone signal 450a and a right virtual microphone signal 450b using beam forming techniques. The left virtual microphone signal 450a and the right virtual microphone 450b may be generated to create an improved spatial representation of the audio source 422 over the raw microphone signals of the left audio channel 430a and right audio channel 430b. This preliminary virtual representation does not compensate for effects of the camera body shape or microphone positioning.

The left virtual microphone 450a and right virtual microphone 450b can then be transformed 460 into a multi-channel audio signal 470 which may be played back by an audio playback device. In some embodiments, the left virtual microphone 450a signal and right virtual microphone signal 450b are not configured into a composite audio channel 470 and are independently used for audio playback.

In the illustrated example of FIG. 4A, as the audio source 422 is rotated about the camera 400, the time delay between audio recorded by the left and right microphones 410 will change based on the origin point of the sound waves 420 and the orientation of the camera 400. FIG. 4B shows an example of the polar spatial response 480 for the left and right virtual microphones at a particular frequency. A polar response plot indicates the intensity of the recorded sound waves as a function the cameras orientation relative to the sound source.

The left virtual microphone 450a and the right virtual microphone 450b generated from the recorded left audio channel 430a and the right audio channel 430b can be represented by the two lines 482 within the polar plot 480. The radial distance (r) of each line 482 from the center point represents the recorded (or generated) audio intensity while the radial orientation (θ) represents the direction of the audio source 422. Using the illustrated example, as the audio source 422 is rotated about the camera 400 system, at a particular frequency, the right virtual microphone signal audio 482b signal may have stronger response when the audio source is on the right side of the camera 400 than the left side of the camera (e.g. a larger radius at 90° than at 270° in the orientation of FIG. 4A). Similarly, as the audio source 422 is rotated about the camera system 400, at a particular frequency, the left virtual microphone signal audio 482a signal may have stronger response when the audio source is on the left side of the camera than the right side of the camera 400.

In the illustrated example, the multi-channel audio signal 470 includes cardioid responses for the left virtual microphone signal 482a and right virtual microphone signal 482b. Two cardioid lobes in a multi-microphone stereo recording system can be desirable for generating a high quality multi-channel audio signal 470 for audio playback. Other possible spatial response profiles can include: omni, cardioid, super-cardioid, hyper-cardioid, and sub-cardioid, all of which can be advantageous in certain microphone configurations, dynamic environments, and playback systems.

FIG. 4C shows an example frequency response 490 for the composite audio signal 470 with a specific audio source 422 in front of the microphones as in FIG. 4A. A frequency response plot indicates the intensity of the recorded sound waves as a function of frequency of the sound waves. The left virtual microphone 450a and the right virtual microphone 450b generated from the recorded left audio channel 430a and the right audio channel 430b can be represented by the two lines 492 within the frequency plot 490. The left virtual microphone signal 492a and the right virtual microphone signal 492b can show substantially similar frequency responses. The substantially similar frequency responses for the left virtual microphone 492a signal and right virtual microphone signal 492b can be caused by the coplanar orientation of the microphones that are both perpendicular to the audio source. Substantially similar frequency responses can be beneficial for generating a high quality multi-channel audio signal 470 for stereo playback that closely approximates a listener's experience of the sound waves 420 generated at the dynamic environment.

Example Camera Configuration with Orthogonal Microphones

A camera system may not have two microphones on a coplanar surface and may instead have microphones on orthogonal surfaces of the camera system 100. FIG. 5 illustrates an example of a camera system with microphones on a top surface 502 and right surface 504 of the camera system 100. In the illustrated system there can be an edge between the two microphones where the top surface and right surface are coupled.

In the illustrated example, the microphones 112 located on orthogonal surfaces of the camera can affect how the microphones receive and record sound waves. FIG. 5 demonstrates how sound waves 510 may interact with the physical camera structure and the microphones 112 of a camera system 100 with microphones on orthogonal surfaces of the camera system (e.g. a top microphone 112a on the top face 502 of the camera system 100 and a right microphone 112b on the right face 504 of the camera system 100). An audio source 520 can be located on a plane parallel to the right face 504 of the camera body 102 and can emit sound waves 510 towards the camera system 100. The sound waves 510 may be received by the right microphone 112b before the top microphone 112a. In some embodiments, the camera body may obstruct a direct path between the source and the top microphone and the sound waves may be diffracted 512 around the edges of the camera system 100, introducing multiple significant acoustic paths of varied intensity and temporal delay that reach the top microphone 112a.

When this occurs, the intensity (e.g. amplitude) of the sound waves 510 recorded by the right microphone 112b can be greater than the intensity of the sound waves 510 recorded by the top microphone 112a. The amplitude differential between the top microphone and right microphone may affect reconstructing a stereo audio signal for an audio playback device. The amplitude differential will be a function of the frequency of sound. It will be smaller for low frequency sound and larger for high frequency sound.

Additionally, the effective time delay between sound being received by the right microphone and the top microphone can be affected by diffraction of the sound waves around edges of the camera body. Diffraction around edges of the camera body will cause variations in the time delay based on the angle of the audio source relative to the microphones of the camera body. The time delays can also be a function of the frequency of the sound waves and may affect reconstruction of the multi-channel audio signal for an audio playback device. In some cases, the measured time delay between the audio signals can be compared to an expected time delay between the audio signals. The expected time delay is the time delay between microphones without diffraction of the sound waves about the camera body. Tuning the beam forming parameters (described below) can be based on this comparison.

Further, when the sound waves interact with the right surface of the camera, the sound waves 510 may create vibrations 530 of the camera housing which may propagate towards the top microphone 112a. These vibrations 530 may introduce additional artifacts in the top microphone 112a audio signal or right microphone 112b audio signal that can further affect reconstruction of a stereo audio signal in an audio playback device. In some instances, the effective time delay caused by the vibrations is dependent on the path the vibrations take towards the microphones through the camera body and the speed of sound in the material of the camera body. Further, the amplitude of the received audio signals at each microphone may be different at dissimilar frequencies based on the vibration path and camera body material. In some instances, the camera body may be designed to minimize these vibrational effects.

Stereo Audio Generation for Orthogonal Surfaces

Figure 6A:
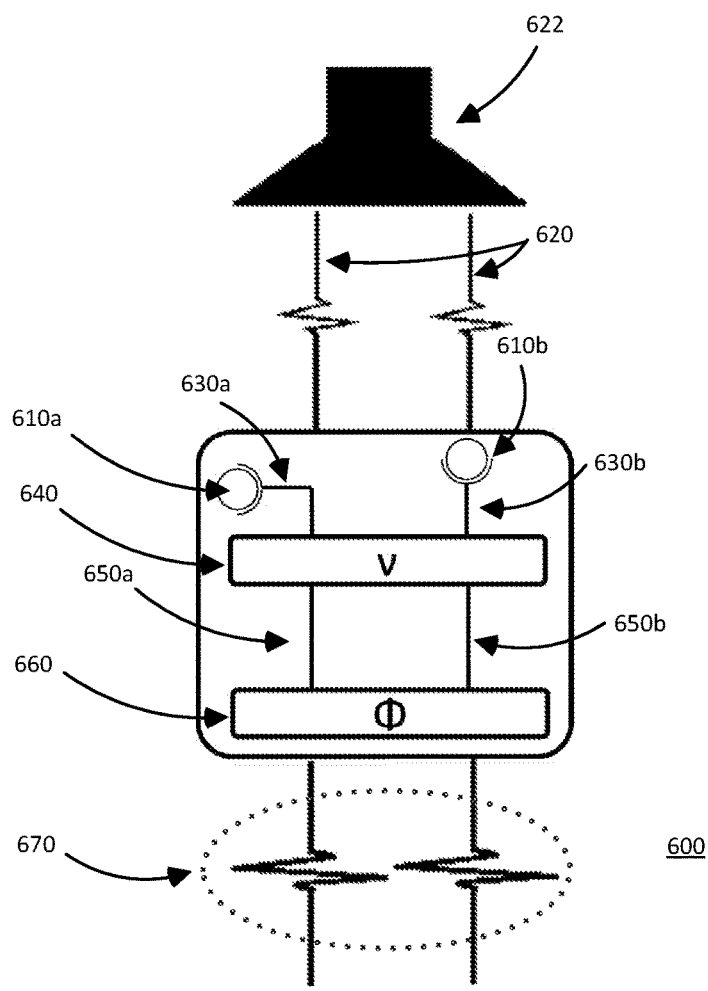
FIG. 6A illustrates stereo audio generation from a camera system with two microphone systems on orthogonal surfaces, according to one embodiment.

FIG. 6A illustrates an embodiment of a camera system 600 with two microphones 610 recording stereo audio with the microphones on orthogonal surfaces of the camera that may generate a multi-channel audio signal. The camera system 600 may be similarly configured to the cameras of FIG. 1 and FIG. 2. Sound waves 620 may be generated by an audio source 622 outside the camera 600 and are propagated towards the front and side surface of the camera body. In the illustrated system, the audio source 622 is located directly in front of the camera 600. When the sound waves 620 interact with the microphones 610 the effect of the camera body configuration and microphone orientation will distort the temporal delay and amplitude differential as a function of frequency in the signals recorded by the microphones 610. As described previously, the sound waves can be diffracted around the edges of the camera or cause vibrations in the camera housing (similar to those described in regards to FIG. 5).

The camera system 600 can have a left microphone 610a and a right microphone 610b on orthogonal surfaces of the camera system that generates a left audio channel 630a and a right audio channel 630b, respectively. The left and right microphones 610 may be omnidirectional microphones that independently record the sound waves 620 which can be transformed 640 into a left virtual microphone 650a and a right virtual microphone signal 650b using beam forming techniques. The left virtual microphone signal 650a and the right virtual microphone 650b may be generated to create an improved spatial representation of the audio source 622 over the raw microphone signals of the left audio channel 630a and right audio channel 630b. This preliminary virtual representation does not compensate for effects of the camera body shape or microphone positioning.

The left virtual microphone 650a and right virtual microphone 650b can then be transformed 660 into a multi-channel audio signal 670 which may be played back by an audio playback device. In some embodiments, the left virtual microphone signal 650a and right virtual microphone signal 650b are not configured into a composite audio channel 670 and are independently used for playback.

Figure 6B:
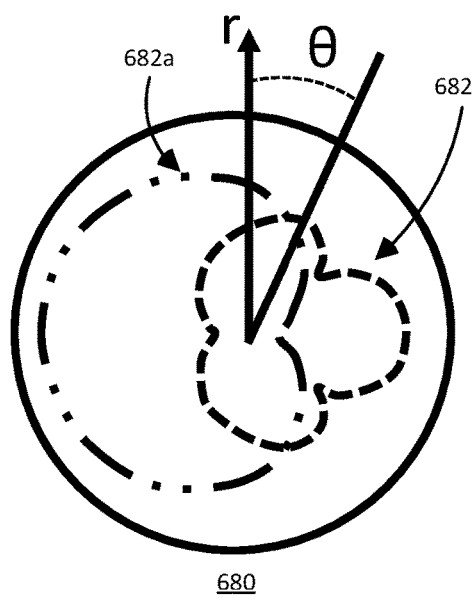
FIG. 6B illustrates the polar spatial response from a camera system with two microphone systems on orthogonal surfaces, according to one embodiment.

In the illustrated example of FIG. 6A, as the audio source 622 is rotated about the camera 600, the time delay between audio recorded by the left and right microphones 610 and the amplitude of the audio recorded by the left and right microphones can change based on the origin point of the sound waves 620 and the orientation of the camera 600. FIG. 6B shows an example of the polar spatial response 680 for the left and right virtual microphones at a particular frequency. For example, when the sound source 622 is placed in the front of the camera 600, the left microphone 610a and the right microphone 610b may not both receive equal amplitude sound waves when camera 600 is facing the front (e.g. to the top of the page in the configuration of FIG. 6A).

The multi-channel audio signal 670 including the left virtual microphone signal 650a and the right virtual microphone signal 650b (generated from the recorded left audio channel 630a and the right audio channel 630b) can be represented by the two lines 682 within the polar plot 680. As the audio source 622 is rotated about the camera 600 system, at a particular frequency, the left virtual microphone signal 682a may have stronger response when the audio source is on the left side of the camera than the right side of the camera. Further, as the audio source 622 is rotated about the camera 600 system, at the particular frequency, the right virtual microphone audio signal 682b may have a significantly reduced response at certain angles due to the configuration of the camera 600.

In the illustrated example, the multi-channel audio signal 670 includes a cardioid response for the left virtual microphone signal 682a and a non-cardioid response for the right virtual microphone signal 682b. The non-cardioid pattern may be a byproduct of the configuration of the camera 600 body which can distort the temporal delay and amplitude differential between the virtual microphone signals as a function of frequency. Other possible spatial response profiles of the virtual microphone signals can include: omni, cardioid, super-cardioid, hyper-cardioid, and sub-cardioid, non-cardiod, or any other possible spatial response profile of the virtual microphone signals.

Figure 6C:
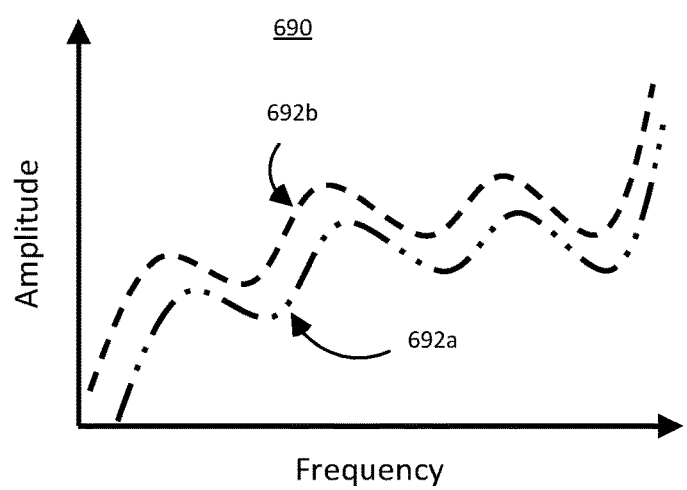
FIG. 6C illustrates the frequency response of a camera system with two microphone systems on orthogonal surfaces, according to one embodiment.

FIG. 6C shows an example frequency response 690 for the recorded audio signal with a specific audio source 622 in front of the microphones as in FIG. 6A. The left virtual microphone 650a and the right virtual microphone 650b generated from the recorded left audio channel 630a and right audio channel 630b can be represented by the two lines 692 within the frequency plot 690. The left virtual microphone signal 692a and the right virtual microphone signal 692b can show substantially dissimilar frequency responses. The substantially dissimilar frequency responses for the left virtual microphone 692a signal and right virtual microphone signal 692b can be caused by the effect of the camera body configuration and microphone orientation that distort the temporal delay and amplitude differential as a function of frequency. Substantially dissimilar frequency responses can affect generating a high quality multi-channel audio signal 670 for stereo playback that closely approximates a listener's experience of the sound waves generated at the dynamic environment.

Correcting Stereo Audio Generation for Orthogonal Surfaces

Microphones on orthogonal surfaces of a camera may distort the expected temporal delay and amplitude differential as a function of frequency that can affect the reconstruction of a stereo audio signal for playback that accurately recreates a listener's experience of the audio source. While the as received audio signals or virtual audio signals generated with standard beam forming equation parameters may not accurately recreate a listener's experience of the audio source when played back, it is possible to modify beam forming parameters applied by the camera system to more accurately reconstruct the audio source for playback. The camera system may use the system memory, system controller, i/o interface, and audio subsystems to modify the beam forming parameters. The modification of beam forming parameters to generate an improved multi-channel audio signal is described in more detail in regards to FIGS. 8-9.

FIG. 7A illustrates an embodiment of a camera system 700 with two microphones 710 recording stereo audio with the microphones 710 on orthogonal surfaces of the camera 700 that may generate a stereo audio signal. The camera system 700 may be similarly configured to the cameras of FIG. 1 and FIG. 2. Sound waves 720 may be generated by an audio source 722 outside the camera and are propagated towards the front and side surface of the camera body. In the illustrated system, the audio source 722 is located directly in front of the camera 700 such that when the sound waves 720 interact with the microphones 710 the effect of the camera body configuration and microphone orientation will distort the temporal delay and amplitude differential as a function of frequency in the signals recorded by the microphones 710 which can be created by diffracted sound waves and camera vibrations (similar to those described in FIG. 5).

The camera system 700 can have a left microphone 710a and a right microphone 710b on orthogonal surfaces of the camera system 700 that generates a left audio channel 730a and a right audio channel 730b, respectively. The left and right microphones 710 may be omnidirectional microphones that independently record the sound waves 720 which can be transformed 740 into a left virtual microphone 750a and a right virtual microphone signal 750b using beam forming techniques. The effective time delay between sound arriving at the left and right microphones and the magnitude coefficients used in the beam forming techniques can be tuned to account for the effects of the camera body. In some cases, the camera system applies dissimilar different time delays and magnitude coefficients for the left virtual microphone and the right virtual microphone. Different effective time delays and magnitude coefficients can also be used for different frequency bands of the same virtual microphone. The left virtual microphone signal 750a and the right virtual microphone 750b may be generated to create an improved spatial representation of an audio source in the dynamic environment over the raw microphone signals of the left audio channel 730a and right audio channel 730b. Henceforth, virtual microphones processed for stereo playback using tuned beam forming parameters will be described as tuned virtual microphones.

The left tuned virtual microphone 750a and right tuned virtual microphone 750b can be transformed 760 into the multi-channel audio signal 770 which may be played back by an audio playback device. In some embodiments, the left tuned virtual microphone 750a signal and right tuned virtual microphone signal 750b are not configured into a multi-channel audio signal 770 and are independently used for playback.

In the illustrated example of FIG. 7A, as the audio source 722 is rotated about the camera 700, the time delay between audio recorded by the left and right microphones 710 and the amplitude of the audio recorded by the left and right microphones will change based on the origin point of the sound waves 720 and the orientation of the camera 700. FIG. 7B shows an example of the polar spatial response 780 for the left and right virtual microphones with tuned beam forming parameters at a particular frequency.

The multi-channel audio signal 770 including the processed left tuned virtual microphone 750a and the right tuned virtual microphone 750b (generated from the recorded audio signal 730a and 730b) can be represented by the two lines 782 within the polar plot 780. As the audio source 722 is rotated about the camera system 700, at a particular frequency, the left tuned virtual microphone signal 782a signal may have stronger response on the left side of the camera than the right side of the camera. Using the illustrated example, as the audio source 722 is rotated about the camera 700 system, at a particular frequency, the as recorded right virtual microphone signal audio signal (not shown) may have a significantly reduced response at certain angles due to the configuration of the camera but the tuned right virtual microphone 782b audio signal has been modified to remove these effects.

In the illustrated example, the composite signal includes a cardioid response for the left tuned virtual microphone signal 782a and the right tuned virtual microphone 782b. The cardioid patterns may be generated by using the beam forming techniques with tuned beam forming parameters on the audio signals to remove effects of the camera body that can distort the temporal delay and amplitude differential. The camera system can also generate other spatial response profiles using various beam forming parameters including: omni, cardioid, super-cardioid, hyper-cardioid, and sub-cardioid, all of which can be advantageous or disadvantageous in certain microphone configurations, dynamic environments, and playback systems.

FIG. 7C shows an example frequency response 790 for the recorded audio signal with a specific audio source 722 in front of the microphones as in FIG. 7A. The left tuned virtual microphone 750a and the right tuned virtual microphone 750b (generated from the recorded audio channels 730a and 730) can be represented by the two lines 792 within the frequency plot 790. The left tuned virtual microphone signal 792a and the right tuned virtual microphone signal 792b can be substantially similar frequency responses. The substantially similar frequency responses for the left tuned virtual microphone 792a signal and right tuned virtual microphone signal 792b can be caused by tuning the beam forming parameters and correcting the temporal delay and amplitude differentials as a function of frequency.

Audio Signal Filtering and Correction

Stereo audio recorded on non-identical left and right audio channels can yield an increased sense of realism and immersion into the experience when played back on a pair of stereo speakers or headphones during simultaneous playback of a video recording. Two microphone channels may be broken into left and right audio channels for left and right speakers and generally have cardioid spatial responses and similar frequency responses.

The effect of the camera body configuration and microphone orientation that distort the temporal delay and amplitude differential for a camera system with microphones on orthogonal surfaces may create a diminished playback experience. The differential beam forming parameters may be tuned to improve the distorted audio channels.

To illustrate this, per frequency band a virtual audio channel can be described as $$V = O_1 * a_1 * Z^{D1} - O_2 * a_2 * Z^{D2} \tag{1}$$

where V is the virtual microphone signal, $O_1$ is the as recorded first microphone, $O_2$ is the as recorded second microphone, $a_1$ is the first gain, $a_2$ is the second gain, and $Z^{D1}$ is the delay of the first signal, and $Z^{D2}$ is delay of the second signal.

If the operations occur only on one of a singular microphone signals at a time, then the equations for creating two microphone channels, $V_1$ and $V_2$, may be:

$$V_1 = O_1 - O_2 * a_2 * Z^{D2} \tag{2}$$

$$V_2 = O_1 * a_1 * Z^{D1} - O_2 \tag{3}$$

As discussed previously there can be an effect of camera body configuration and camera body vibrations on the received microphone signal. The effective impact of the camera body on Equation 1 can be modeled by introducing a representative angle dependent summation to each of the microphone signals in Equation 1. Per frequency band, assuming k acoustic paths as a function of θ source angle, the microphone signals may be $$O'_1(\theta) = O_1 * \Sigma_{k=1}^{K} g_1(\theta, k) * Z^{d1(\theta, k)} \tag{4}$$

$$O'_2(\theta) = O_2 * \Sigma_{k=1}^{K} g_2(\theta, k) * Z^{d2(\theta, k)} \tag{5}$$

Where $O_1$ and $O_2$ are the received raw signals the microphones may obtain with no diffractions (e.g., microphones in free field), $O'_1$ and $O'_2$ can be the observed received raw responses that include the diffractions (e.g. camera systems cameras on dissimilar surfaces), $g_1$ and $g_2$ are angle and path dependent impact of the camera body on the amplitudes, and $Z^{d1}$ and $Z^{d2}$ are angle and path dependent impact of the camera body on the delays.

$V_1$ and $V_2$ are now functions of angle, and the equation (3) can become $$V_1(\theta) = O'_1(\theta) - O_2(\theta) * (\Sigma_{k=0}^{K} g_{1\theta}(k)_2 * Z^{d1\theta(k)}) * a * Z^D \tag{6}$$

$$V_2(\theta) = O_1(\theta) * (\Sigma_{k=0}^{K} g_{2\theta}(k)_2 * Z^{d2\theta(k)}) * a * Z^D - O'_2(\theta) \tag{7}$$

where g and d can be approximated analytically or numerically based on the geometric shape of the camera and position of the microphones. The total microphone signals can now be written as $$V'_1 = \Sigma_{\theta=1}^{L} V_1(\theta) \tag{8}$$

$$V'_2 = \Sigma_{\theta=1}^{L} V_2(\theta) \tag{9}$$

To achieve appropriate response shapes for immersive stereo audio playback, and if the angle of the source is not known, $a_1$, $a_2$, $D_1$ and $D_2$ may be tuned for the properties of the camera body and microphone placement. In one example the front-to-back ratio is calculated to optimize the $a_1$, $a_2$, $D_1$ and $D_2$ beam forming parameters of Eqn. 2 and Eqn. 3. The front-to-back ratio is a measure of a single virtual microphone's noise sensitivity from disparate regions of a spatial response profile. In one example, the front-to-back ratio is calculated as the difference in noise sensitivity between a hemisphere of angles in the spatial response profile with the highest response (e.g., the lobe side of a cardioid response) and a hemisphere of angles in the spatial response profile with the lowest response (e.g., the null side of a cardioid response). As the front-to-back ratio is not dependent on the direction of the source, it can be used to tune the $a_1$, $a_2$, $D_1$ and $D_2$ beam forming parameters. Generally, optimizing the beam forming parameters results in the increasing front-to-back ratios. Whatever the case, optimizing the beam forming parameters results in a more desirable spatial response profile as previously described.

Audio Signal Processing

Figure 8:
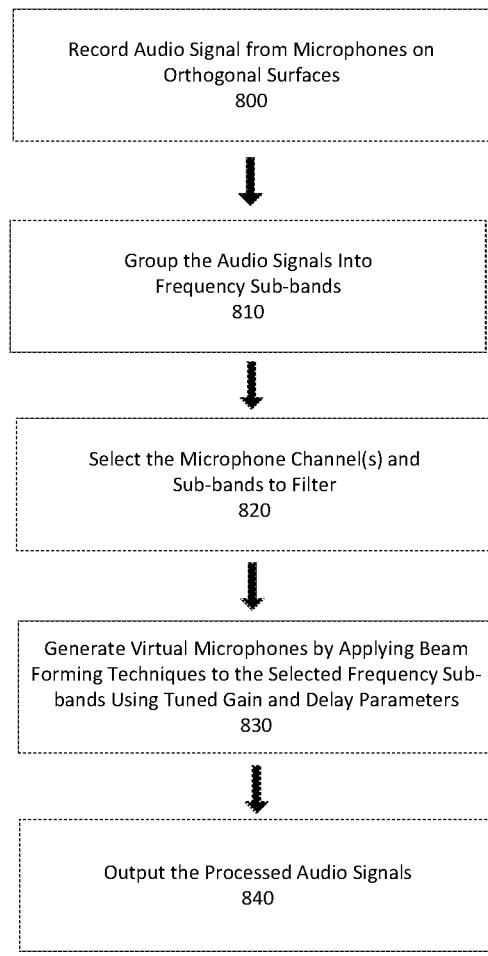
FIG. 8 demonstrates the process for generating corrected stereo audio from microphones on two orthogonal surfaces, according to one embodiment.

FIG. 8 is a flowchart of the signal processing that may be performed by a camera system with two microphones on orthogonal surfaces to achieve a stereo audio signal that is immersive during audio playback as described previously.

The camera system can use the audio subsystems and microphones on the top and side surfaces to record 800 a top microphone signal and a side microphone signal (i.e. left and right).

The audio subsystems may process the top and side raw microphone signals and group 810 the audio signals into frequency sub-bands. Grouping the audio signals into frequency sub-bands allows for the audio subsystem to process individual portions of the audio spectrum. Processing individual portions of the audio sub-bands can allow for a more immersive audio playback experience.

The recorded microphone signals from the top and side surfaces can be processed to generate 830 a left virtual microphone and a right virtual microphone. The virtual microphones may be created to form a more accurate representation of the event that generated the sound waves as experienced by a listener. For example, the virtual microphones may be created by combining the top and side microphone signals to produce signals more appropriate for stereo audio playback with a dual speaker system. In one example, the system applies gain and delay to the recorded channels and sub-bands in implementing beam forming techniques to generate the virtual microphones. In some embodiments, the gain and delay applied to the sub-bands can be pre-defined values stored in the system memory, determined by the audio subsystem in real-time, determined by the system controller in real time, or can be based on information from the sensors in the camera system.

After processing the signals, the input/output interface can output 840 the multi-channel audio signal for playback on a playback device. The output audio signal can be a multi-channel audio signal consisting of the processed left and right virtual microphone signals, the top and side processed microphone signals independently, the unprocessed top and side virtual microphone signals, or any combination of recorded or processed audio signals obtained or generated during the recording process. In some embodiments, the playback device may be the control/display subsystem.

Example Signal Processing

FIGS. 9A-9D are examples of the spatial response profiles resulting from application of the audio processing algorithm on a camera system recording sound in a dynamic environment. The camera system includes a top and side microphone on orthogonal faces of the camera for recording sound waves generated by the dynamic environment. FIG. 9A is an example spatial response at a particular frequency sub-band of the received audio from the camera system. FIG. 9B is an example of the desired spatial response for the frequency sub-band of the microphone system. The desired spatial response is beneficial for high quality stereo audio on a playback device. FIG. 9C is an example of the spatial response profiles for the frequency sub-band without tuning the beam forming parameters. FIG. 9D is an example of the spatial response for the frequency sub-band using tuned beam forming parameters. The tuned beam forming parameters generates virtual microphone signals that are more cardioid in shape than virtual microphone signals generated without tuned beam forming parameters. Generally, tuning the beam forming parameters improves the front-to-back ratio of the audio signals.

FIGS. 9A-9D are an example of a single frequency sub-band (e.g., 500-1000 Hz, 1000 Hz-10 k Hz, etc.). However, the desired spatial response can be dissimilar for different frequency sub-bands (e.g., cardioid for one sub-band, hyper-cardioid for another sub-band). There is no limit to the number of sub-bands that can use tuned beam forming parameters.

Additionally, the tuned beam forming parameters may not generate audio signals that exactly mirror the desired spatial responses. However, generating audio signals using tuned beam forming parameters results in a spatial response nearer the desired spatial response than using un-tuned beam forming parameters.

ALTERNATE CONFIGURATIONS

While the described embodiments define surfaces for the microphone systems, it will be obvious to one skilled in the art that the choices of surface are arbitrary and may be any two surfaces of the camera system. Further the surfaces of the camera system may not be orthogonal but can be any two surfaces of the camera system (e.g. the surfaces can be at a thirty degree angle to one another, or may be on opposing surfaces of a camera system which are parallel, etc.).

In some frequency ranges non-cardioid shapes are more preferential for audio playback than the classically desirable cardioids. For example in frequency ranges of less than 1 kHz and greater than 6 kHz the desired spatial shape can be omnidirectional.

In some embodiments, the audio signals can be obtained from an electronic device including a camera system and microphones on separate surfaces of the electronic device such as: a cell phone, a tablet computer, a personal computer, a laptop computer, or any other similar devices.

ADDITIONAL CONFIGURATION
CONSIDERATIONS

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for an electronic device with a beam forming microphone array as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A camera system, comprising:
    a first microphone on a first surface;
    a second microphone on a second surface, wherein the second surface is substantially orthogonal to the first surface; and
    a processor, the processor coupled with a memory storing instructions that when executed causes the processor to:
        apply a set of beam forming parameters in audio channels associated with the first and second microphones;
        process the audio channels using the set of beam forming parameters to generate virtual microphone channels; and
        combine the virtual microphone channels into an audio stream.

2. The camera system of claim 1, wherein the set of beam forming parameters applied to the audio channels is associated with a linear distance between the first microphone and the second microphone across a surface of a camera body.

3. The camera system of claim 1, wherein the set of beam forming parameters applied to the audio channels is associated with a linear distance between the first microphone and the second microphone through a camera body.

4. The camera system of claim 1, wherein the set of beam forming parameters applied to the audio channels is based on maximizing a noise ratio between opposing hemispheres of a spatial response of the audio channels.

5. The camera system of claim 1, wherein the set of beam forming parameters are independently applied to separate frequency sub-bands of the audio channels based on a shape of a camera body and a frequency range of the separate frequency sub-bands.

6. The camera system of claim 1, wherein the set of beam forming parameters are tuned for temporal, spectral, and spatial characteristics and access gain and delay values stored in the memory associated with characteristics and a shape of a camera body.

7. An electronic device, comprising:
    a device body;
    a first microphone on a first surface of the electronic device;

a second microphone on a second surface of the electronic device, wherein the second surface is substantially orthogonal to the first surface;
an audio assembly; and
a processor, the processor coupled with a memory storing instructions that when executed causes the processor to:
apply a set of tuned parameters in audio channels associated with orthogonality of the first surface and the second surface;
process the audio channels using the set of tuned parameters to generate virtual channels; and
combine the virtual channels into an audio stream.

8. The electronic device of claim 7, wherein the set of tuned parameters applied to the audio channels is associated with a linear distance between the first microphone and the second microphone across a surface of the electronic device.

9. The electronic device of claim 7, wherein the set of tuned parameters applied to the audio channels is associated with a linear distance between the first microphone and the second microphone through the device body.

10. The electronic device of claim 7, wherein the set of tuned parameters applied to the audio channels is based on maximizing a noise ratio between opposing hemispheres of a spatial response of the audio channels.

11. The electronic device of claim 7, wherein the set of tuned parameters are independently applied to separate frequency sub-bands of the audio channels based on a shape of the device body and a frequency range of the separate frequency sub-bands.

12. The electronic device of claim 7, wherein the set of tuned parameters are beam forming parameters that are tuned for temporal, spectral, and spatial characteristics and access gain and delay values stored in the memory associated with the device body.

13. A method, comprising:
capturing audio channels from a first microphone of a camera and a second microphone of the camera, wherein the second microphone is substantially orthogonal to the first microphone;
applying a set of tuned beam forming parameters to a set of frequency sub-bands of the audio channels associated with the first microphone and the second microphone;
processing the audio channels using the set of tuned beam forming parameters to generate virtual microphone channels; and
combining the virtual microphone channels into an audio stream that is configured for stereo audio playback.

14. The method of claim 13, wherein the set of tuned beam forming parameters applied to the audio channels is associated with a linear distance between the first microphone and the second microphone across a surface of a camera body.

15. The method of claim 13, wherein the set of tuned beam forming parameters applied to the audio channels is associated with a linear distance between the first microphone and the second microphone through a camera body.

16. The method of claim 13, wherein the set of tuned beam forming parameters applied to the audio channels is based on maximizing a noise ratio between opposing hemispheres of a spatial response of the audio channels.

17. The method of claim 13, wherein the set of tuned beam forming parameters are independently applied to separate frequency sub-bands of the audio channels based on a shape of a camera body and a frequency range of the separate frequency sub-bands.

18. The method of claim 13, wherein the set of tuned beam forming parameters are tuned for temporal, spectral, and spatial characteristics and access gain and delay values stored in memory associated with characteristics of a camera body.

* * * * *